(12) United States Patent
Yoshii et al.

(10) Patent No.: US 6,400,553 B2
(45) Date of Patent: Jun. 4, 2002

(54) MULTI-LAYER CERAMIC ELECTRONIC DEVICE AND METHOD FOR PRODUCING SAME

(75) Inventors: Akitoshi Yoshii; Shintarou Kon; Kazuhiko Kikuchi; Takashi Kamiya; Akira Sasaki, all of Akita-ken (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/840,904

(22) Filed: Apr. 25, 2001

(30) Foreign Application Priority Data

Apr. 25, 2000 (JP) ........................................ 2000-124132

(51) Int. Cl.⁷ .............................................. H01G 4/06
(52) U.S. Cl. ................................ 361/321.2; 361/321.5; 361/321.2; 361/306.1; 361/311; 361/313
(58) Field of Search ......................... 361/321.2, 321.3, 361/321.4, 321.5, 322, 301.4, 306.1, 313, 320, 309, 311

(56) References Cited

U.S. PATENT DOCUMENTS

| | | | | |
|---|---|---|---|---|
| 5,335,139 A | * | 8/1994 | Nomura et al. ................. | 361/4 |
| 5,561,587 A | * | 10/1996 | Sanada ..................... | 361/306.1 |
| 5,668,694 A | * | 9/1997 | Sato et al. ................. | 361/321.4 |
| 5,862,034 A | * | 1/1999 | Sato et al. ................. | 361/321.5 |
| 5,877,934 A | * | 3/1999 | Sano et al. .................. | 361/312 |
| 6,124,769 A | * | 9/2000 | Igarashi et al. ............. | 333/172 |
| 6,160,472 A | * | 12/2000 | Arashi et al. ................. | 338/21 |
| 6,185,087 B1 | * | 2/2001 | Park et al. ................ | 361/321.4 |

FOREIGN PATENT DOCUMENTS

| | | |
|---|---|---|
| JP | A 6-176953 | 6/1994 |
| JP | A 9-35995 | 2/1997 |

* cited by examiner

*Primary Examiner*—Anthony Dinkins
*Assistant Examiner*—Nguyen Ha
(74) *Attorney, Agent, or Firm*—Oliff & Berridge, PLC (57) ABSTRACT

A multi-layer ceramic electronic device having a device body including alternately arranged dielectric layers and internal electrode layers and external electrodes formed on an outer surface of the device body, wherein the external electrodes have an undercoat layer directly formed on the outer surface of the device body so as to be electrically connected with at least part of the internal electrode layers, an intermediate layer formed on the outer surface of the undercoat layer, and an outer layer formed on the outer surface of the intermediate layer; the undercoat layer includes a first conductive material mainly made of copper and a first glass ingredient; the intermediate layer includes a second conductive material mainly made of a copper-palladium-based alloy; and the outer layer includes a third conductive material mainly made of silver and further containing palladium and a second glass ingredient.

9 Claims, 6 Drawing Sheets

MULTI-LAYER CERAMIC ELECTRONIC DEVICE AND METHOD FOR PRODUCING SAME

BACKGROUND OF THE INVENTION

1. Field of the Invention

The present invention relates to a multi-layer ceramic chip capacitor or other multi-layer ceramic electronic device and a method for production of the same.

2. Description of the Related Art

A multi-layer ceramic chip capacitor, one example of a multi-layer ceramic electronic device, has a capacitor device body comprised of alternately stacked dielectric layers and internal electrode layers. A pair of external electrodes conductive with the alternately stacked internal electrodes inside the capacitor device body is formed at the two ends of the capacitor device body.

In general, a solder containing lead (Pb) is used for fixing and mounting a multi-layer ceramic capacitor on a circuit board. Therefore, a tin (Sn) or Sn/Pb plating is formed on the outermost layer of the external electrodes to improve the bonding strength of the capacitor and solder wettability.

When considering the effect of lead on the environment, however, it is preferable to fix and mount the capacitor on the circuit board without using a solder containing lead (lead-free mounting). Fixing and mounting using a conductive adhesive is therefore being studied.

If a conductive adhesive is used for mounting a conventional multi-layer ceramic chip capacitor to a circuit board, however, the following inconveniences occur.

First, the Sn or Sn/Pb plating formed on the outermost layer of the external electrodes oxidizes faster in a high temperature, high humidity environment. If the plating at the outermost layer of the external electrodes oxidizes, the connection resistance (ESR) becomes higher and, in the functions of the capacitor, the dielectric loss (tanδ) becomes greater and inconveniences occur in the electrical circuit.

Second, with repeated heat cycles, microcracks occur between the conductive adhesive and the external electrodes. If microcracks occur between the conductive adhesive and external electrodes, the bonding strength of the capacitor and circuit board may degrade, the capacitor may stop functioning on the electrical circuit, and the capacitor may even fall off the circuit board.

SUMMARY OF THE INVENTION

An object of the present invention is to provide a multi-layer ceramic chip capacitor or other multi-layer ceramic electronic device having external electrodes not very liable to oxidize even if mounting the device on a circuit board using a conductive adhesive and resistant to formation of cracks with the conductive adhesive even if subjected to repeated heat cycles and a method for producing the same.

To achieve the above object, according to a first aspect of the present invention, there. is provided a multi-layer ceramic electronic device comprising a device body comprised of alternately arranged dielectric layers and internal electrode layers and external electrodes formed on an outer surface of the device body, outer layers of the external electrodes comprised of a conductive material mainly comprised of silver and further including palladium (corresponding to later explained third conductive material) and glass ingredient (corresponding to later explained second glass ingredient).

Preferably, each of the external electrodes have an undercoat layer directly formed on the outer surface of the device body so as to be electrically connected with at least part of the internal electrode layers, an intermediate layer formed on an outer surface of the undercoat layer, and the outer layer formed on an outer surface of the intermediate layer; the undercoat layer includes a first conductive material mainly comprised of copper and a first glass ingredient; the intermediate layer includes a second conductive material mainly comprised of a copper-palladium-based alloy; and the outer layer includes a third conductive material mainly comprised of silver and further containing palladium and a second glass ingredient.

Preferably, the second glass ingredient includes a glass ingredient of the same composition as the first glass ingredient.

Preferably, the first glass ingredient includes a strontium borosilicate-based glass.

Preferably, the internal electrode layer includes a base metal.

Preferably, the undercoat layers are formed on only two end faces of the device body.

To achieve the above object, according to a second aspect of the present invention, there is provided a method of producing a multi-layer ceramic electronic device comprising the steps of coating on an outer surface of a device body comprised of alternately arranged dielectric layers and internal electrode layers an undercoat layer paste including a first conductive material mainly comprised of copper and a first glass ingredient so as to be electrically connected with at least part of the internal electrode layers to thereby form a pre-baking undercoat layer; coating on an outer surface of said pre-baking undercoat layer an outer layer paste including a third conductive material mainly comprised of silver and further including palladium and a second glass ingredient to thereby form a pre-baking outer layer; and co-baking said pre-baking undercoat layer and said pre-baking outer layer at a temperature of over 600° C. and less than 800° C. to form an undercoat layer and outer layer and form between the undercoat layer and outer layer an intermediate layer including a second conductive material mainly comprised of a copper-palladium-based alloy.

Preferably, the second glass ingredient includes a glass ingredient of the same composition as the first glass ingredient.

Preferably, the undercoat layer paste is coated to form the pre-baking undercoat layer on only two end faces of the device body.

That is, the multi-layer ceramic electronic device according to the present invention has external electrodes formed on the outer surface of a device body comprised of alternately arranged dielectric layers and internal electrode layers, and the outer layer of the external electrodes is formed of a specific material.

Therefore, even if the multi-layer ceramic electronic device of the present invention is mounted on a circuit board using a conductive adhesive not containing lead (Pb) under a high temperature, high humidity environment, there is little liability of the outermost layer of the external electrodes being oxidized. Further, even with repeated heat cycles, there is resistance to formation of microcracks between the external electrodes and the conductive adhesive.

As a result, if using the multi-layer ceramic electronic device according to the present invention, it is possible to suppress the connection resistance (ESR), reduce the dielectric loss (tanδ), and maintain a high bonding strength to the circuit board, so it is possible to reliably prevent inconveniences on the electrical circuit, detachment from the circuit board, and other matters and to improve the reliability.

In the present invention, by giving the external electrodes an undercoat layer formed directly on the outer surface of the device body and including in the undercoat layer a first conductive material mainly comprised of copper having a good wettability with the base metal included in the internal electrode layers, it is possible to maintain a good bonding strength between the undercoat layer and the internal electrode layers.

In the present invention, by giving the external electrodes an intermediate layer formed on the outer surface of the undercoat layer and including in the intermediate layer a second conductive material mainly comprised of a silver-palladium-based alloy, it is possible to maintain a good bonding strength at the interface between the undercoat layer and a later explained outer layer.

In the present invention, by giving the external electrodes an outer layer formed on the outer surface of the intermediate layer and including in the outer layer a third conductive material mainly comprised of silver, even if mounting the device on a circuit board using a conductive adhesive not containing lead (Pb), there is little liability of the outer layer being oxidized and there is little liability of the interface between the internal electrode layers and the external electrodes being oxidized at the time of baking the external electrodes to the device body.

In the present invention, by including in the second glass ingredient contained in the outer layer a glass ingredient of the same composition as the first glass ingredient contained in the undercoat layer (preferably strontium borosilicate-based glass), it is possible to form all of the external electrodes formed on the outer surface of the device body as a dense bonded layer.

In the method of producing a multi-layer ceramic electronic device according to the present invention, a pre-baking undercoat layer and pre-baking outer layer formed on the outer surface of a device body comprised of alternately arranged dielectric layers and internal electrode layers are baked at a specific temperature. Due to this, an undercoat layer and outer layer are formed and a specific intermediate layer is created between the undercoat layer and outer layer. When mounting the multi-layer ceramic electronic device obtained in this way on a circuit board using a conductive adhesive not containing lead (Pb) under a high temperature, high humidity environment, the outer layer is not very liable to be oxidized and there is resistance to formation of microcracks between the outer layer and the conductive adhesive even with repeated heat cycles. Therefore, according to the method of the present invention, it is possible to produce a multi-layer ceramic electronic device improved in reliability. Further, in the method of the present invention, by not performing electroplating and by co-baking the pre-baking undercoat layer and pre-baking outer layer rather than performing them separately, the production process is simplified, so it is possible to produce a multi-layer ceramic electronic device improved in reliability.

In the method of the present invention, by coating an undercoat layer paste to form the pre-baking undercoat layers on only the two end faces of the device body, it is possible to suppress the increase of thickness around the peripheral side edges of the device body even if thickness of the external electrodes formed by the later baking increases, so it is possible to accurately obtain the dimensions of the external electrodes.

The multi-layer ceramic electronic device is not particularly limited, but may be for example a multi-layer ceramic chip capacitor, piezoelectric element, chip inductor, chip varistor, chip thermistor, chip resistor, other surface mounted (SMD) chip type electronic device etc.

The present disclosure relates to subject matter contained in Japanese Patent Application No. 2000-124132 (filed on Apr. 25, 2000), the disclosure of which is expressly incorporated herein by reference in its entirety.

BRIEF DESCRIPTION OF THE DRAWINGS

These and other objects and features of the present invention will be more apparent from the following description given with reference to the accompanying drawings, wherein.

DESCRIPTION OF THE PREFERRED EMBODIMENTS

The preferred embodiments of the present invention will be explained in detail next with reference to the attached drawings.

In the embodiments, the explanation will be made with reference to the example of the multi-layer ceramic chip capacitor 2 shown in FIG. 1.

Figure 1:
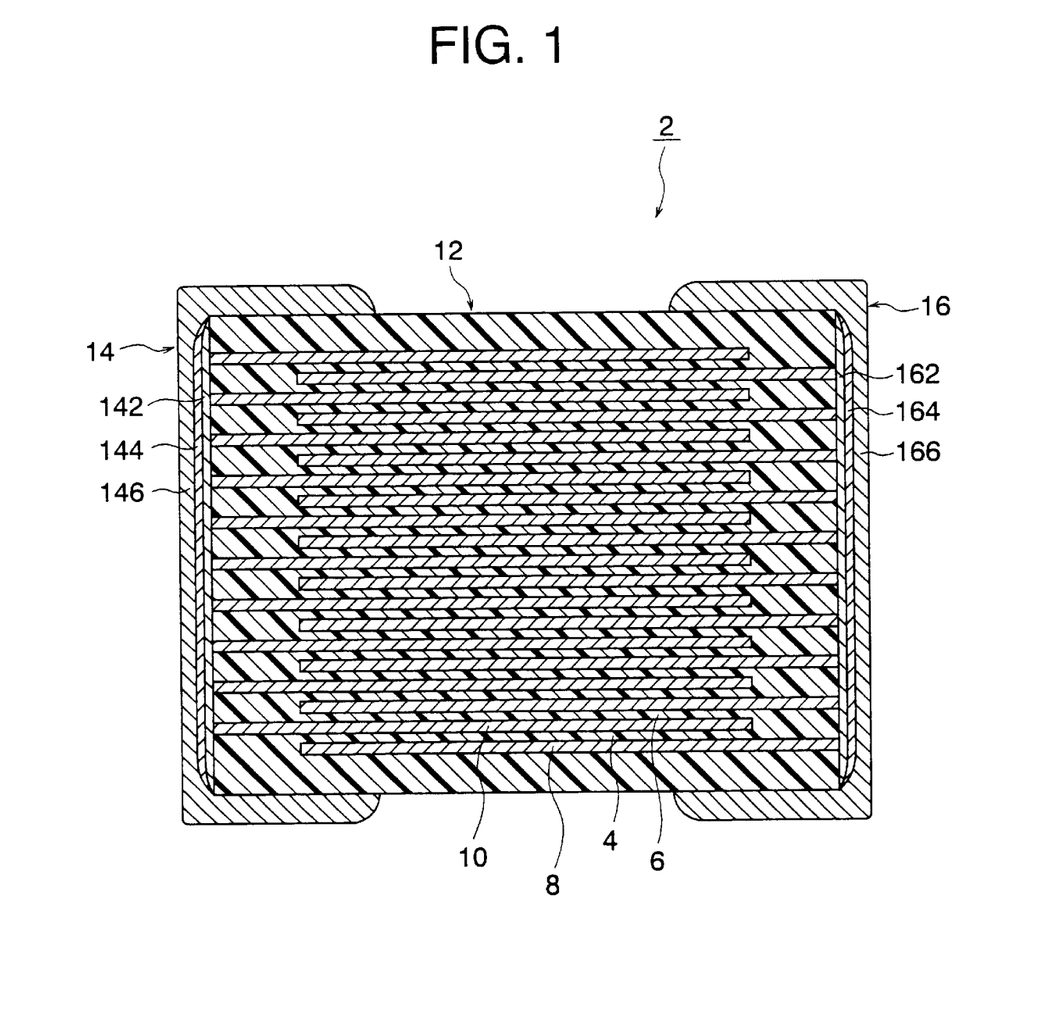
FIG. 1 is a sectional view schematically showing a multi-layer ceramic chip capacitor according to an embodiment of the present invention.

As shown in FIG. 1, the multi-layer ceramic chip capacitor 2 according to an embodiment of the present invention has a capacitor device body 12 comprised of alternately arranged dielectric layers 4, 6 and internal electrode layers 8, 10. Two external electrodes 14, 16 conductive with the internal electrode layers 8, 10 alternately arranged inside the capacitor device body 12 are formed at the two ends of the capacitor device body 12. The shape of the capacitor device body 12 is not particularly limited, but normally is made a parallelopiped. Further, the dimensions of the capacitor device body 12 are not particularly limited and may be made dimensions suitable for the application, but normally are a length of 0.6 to 5.6 mm, preferably 0.6 to 3.2 mm, a width of 0.3 to 5.0 mm, preferably 0.3 to 1.6 mm, and a thickness of 0.3 to 1.9 mm, preferably 0.3 to 1.6 mm.

The internal electrode layers 8, 10 are stacked so that their end faces are alternately exposed at the surfaces of the two facing ends of the capacitor device body 12. The pair of external electrodes 14, 16 are formed at the two ends of the capacitor device body 12 and are connected to the exposed ends of the alternately arranged internal electrode layers 8, 10 to form a capacitor circuit.

The dielectric layers 4, 6 may be comprised of a dielectric ceramic such as a lead-based perovskite, barium titanate, strontium titanate, or calcium titanate, but is not particularly limited in the present invention. The thickness of the dielectric layers 4, 6 is not particularly limited, but generally is several microns to several hundred microns. The number of the dielectric layers 4, 6 stacked is normally at least 100 layers, preferably is at least 200 layers.

The internal electrode layers 8, 10 preferably include a base metal. A base metal is inexpensive, so the cost of the materials can be kept down as a whole even if increasing the ratio of the internal electrode layers 8, 10 in the capacitor device body 12 or the number of layers stacked. The base metal is preferably at least one metal selected from copper (Cu), nickel (Ni), copper alloy, and nickel alloy, more preferably nickel or nickel alloy. The nickel alloy preferably is an alloy of nickel with at least one element selected from manganese (Mn), chromium (Cr), cobalt (Co), and aluminum (Al). The content of nickel in the nickel alloy is preferably at least 95 wt%. Note that the nickel or nickel alloy may also Include up to about 0.1 wt% of various trace ingredients such as phosphorus (P), Iron (Fe), and magnesium (Mg). The thickness of the internal electrode layers 8, 10 may be suitably determined in accordance with the application, but normally is 0.5 to 5 $\mu$m, preferably 1 to 3 $\mu$m.

The external electrodes 14, 16 are comprised of three-layer structures of the undercoat layers 142, 162 formed directly at the two ends of the capacitor device body 12 (preferably only at the two end faces). so as to electrically connect with the exposed ends of the internal electrode layers 8, 10, intermediate layers 144, 146 formed on the outer surfaces of the undercoat layers 142, 162, and outer layers 146, 166 formed on the outer surfaces of the intermediate layers 144, 164.

The undercoat layers 142, 162 include a first conductive material and a first glass ingredient.

The first conductive material is mainly comprised of copper (Cu) and may further include at least one element selected from nickel (Ni), silver (Ag), and palladium (Pd). The first conductive material may also include various trace ingredients such as gold (Au), platinum (Pt) and zinc (Zn). The content of copper in the first conductive material of the undercoat layers 142, 162 is preferably 85 to 100 wt%.

The first glass ingredient is not particularly limited, but preferably is comprised of a strontium borosilicate-based glass. In the strontium borosilicate-based glass, part of the strontium (Sr) may be substituted by barium (Ba). The first glass ingredient may also include aluminum (Al), zinc (Zn), etc. The ratio by weight of the first glass ingredient with respect to the first conductive material (first glass ingredient/first conductive material) is preferably 2/98 to 15/85.

The thickness of the undercoat layers 142, 162 is not particularly limited, but is preferably 1 to 50 $\mu$m.

The intermediate layers 144, 164 include a second conductive material. The second conductive material is mainly comprised of a Cu—Pd based alloy containing copper (Cu) and palladium (Pd) and may further include another metal such as silver (Ag) and nickel (Ni). The second conductive material may also include various trace ingredients such as gold (Au), platinum (Pt) and zinc (Zn). The ratio by weight of the Cu and Pd in the Cu—Pd-based alloy (Cu/Pd) is preferably 10/90 to 90/10. The content of the Cu—Pd based alloy in the intermediate layers 144 and 164 is preferably 1 to 10 wt%.

The thickness of the intermediate layers 144 and 164 is not particularly limited, but is preferably 0.5 to 10 $\mu$m.

The outer layers 146 and 166 include a third conductive material and a second glass ingredient.

The third conductive material is mainly comprised of silver (Ag), contains palladium (Pd), and may further include at least one of copper (Cu) and gold (Au). The third conductive material may also include various trace ingredients such as nickel (Ni) and zinc (Zn). The content of silver in the outer layers 146, 166 is preferably 75 to 95 wt%. The content of palladium in the outer layers 146, 166 is preferably 1 to 25 wt%.

The second glass ingredient is not particularly limited, but preferably includes a glass ingredient of the same composition as the first glass ingredient contained in the undercoat layers 142, 162, more preferably is comprised of a glass ingredient of the same composition as the first glass ingredient. The glass ingredient is preferably a strontium borosilicate-based glass. The ratio by weight of the second glass ingredient with respect to the third conductive material in the outer layers 146, 166 (second glass ingredient/third conductive material) is preferably 2/98 to 15/85.

The thickness of the outer layers 146, 166 is not particularly limited, but is preferably 5 to 80 $\mu$m.

The multi-layer ceramic chip capacitor 2 according to the present embodiment includes external electrodes 14, 16 formed at the two ends of the device body 12 comprised of the alternately arranged dielectric layers 4, 6 and internal electrode layers 8, 10. These external electrodes 14, 16 are comprised of three-layer structures of the undercoat layers 142, 162 formed directly at the two ends of the capacitor device body 12 (preferably only at the two end faces) so as to electrically connect with the exposed ends of the internal electrode layers 8, 10, intermediate layers 144, 146 formed on the outer surfaces of the undercoat layers 142, 162, and outer layers 146, 166 formed on the outer surfaces of the intermediate layers 144, 164.

Therefore, even if the multi-layer ceramic chip capacitor 2 according to the present embodiment is mounted on a circuit board using a conductive adhesive not containing lead (Pb) under a high temperature, high humidity environment, there is little liability of the outer layers 146, 166 being oxidized. Further, even with repeated heat cycles, there is resistance to formation of microcracks between the external electrodes 14, 16 and the conductive adhesive.

As a result, if using the multi-layer ceramic chip capacitor 2 according to the present embodiment, it is possible to suppress the connection resistance (ESR), reduce the dielectric loss (tan$\delta$), and maintain a high bonding strength to the circuit board, so it is possible to reliably prevent inconveniences on the electrical circuit, detachment from the circuit board, and other matters and to improve the reliability.

Next, an example of the method of producing a multilayer ceramic chip capacitor 2 according to the present embodiment will be explained.

(1) First, the dielectric layer paste, internal electrode layer paste, external electrode pastes (undercoat layer paste and outer layer paste) are prepared.

The dielectric layer paste is produced by kneading a dielectric material and organic vehicle.

For the dielectric material, use is made of a powder of a composition of the dielectric layers 4, 6. The dielectric material is not particularly limited and may be various dielectric materials, but for example a titanium-based oxide, titanium-based complex oxide, or mixture of the same are preferred. As a titanium-based oxide, a $TiO_2$ based oxide containing as required NiO, CuO, $Mn_3O_4$, $Al_2O_3$, MgO, $SiO_2$, etc. to a total of 0.001 to 30 wt % may be mentioned. As a titanium-based complex oxide, barium titanate ($BaTiO_3$) etc. may be mentioned. The atomic ratio of Ba/Ti should be about 0.95 to 1.20. It is also possible to further add to the $BaTiO_3$ a total of about 0.001 to 30 wt % of MgO, CaO, $Mn_3O_4$, $Y_2O_3$, $V_2O_5$, ZnO, $ZrO_2$, $Nb_2O_5$, $Cr_2O_3$, $FeO_3$, $P_2O_5$, $Na_2O_3$, $K_2O$, etc. Further, to adjust the firing temperature and linear expansion rate, a $(Ba,Ca)SiO_2$ glass or other glass may be added in the dielectric paste.

The method of producing the dielectric material is not particularly limited. For example,.when using barium titanate, it is possible to use the method of mixing a subcomponent material in hydrothermally synthesized $BaTiO_3$. Further, it is possible to use the method of dry synthesis comprising calcining a mixture of $BaCO_3$, $TiO_2$, and the subcomponent material to cause a solid phase reaction. Further, it is also possible to calcine a mixture of a precipitate obtained by the coprecipitation method, sol gel method, alkali hydrolysis method, precipitation mixing method, etc. and the subcomponent ingredients. Note that for the subcomponent, use may be made of at least one of oxides or various compounds forming oxides upon firing, for example, carbonates, oxalates, hydroxides, organic metal compounds, etc.

The average particle size of the dielectric material may be determined in accordance with the average crystal particle size of the targeted dielectric layers, but normally use is made of a powder of an average particle size of 0.3 to 1.0 $\mu$m or so.

The organic vehicle is comprised of a binder dissolved in an organic solvent. The binder used in the organic vehicle is not particularly limited and may be suitably selected from ethyl cellulose and other various usual binders. Further, the organic solvent used is also not particularly limited and may be suitably selected from various organic solvents such as terpineol, butyl carbitol, acetone, and toluene in accordance with the printing method, sheet method, or other method used. The amount of coating of the dielectric layer paste may be suitably adjusted so that the thicknesses of the dielectric layers 4, 6 per final layer become the above thickness.

The internal electrode layer paste is preferably prepared by kneading at least a base metal and the above organic vehicle. As the base metal, one of the above may be used. By using components of the dielectric layers 4, 6 having resistance to reduction, an inexpensive base material may be used. The amount of the internal electrode layer paste coated may be adjusted so that the thicknesses of the final internal electrode layers 8, 10 become the above thicknesses.

The undercoat layer paste is prepared from at least a first conductive material mainly comprised of copper, a first glass frit, and an organic vehicle.

The average particle size of the first conductive material is preferably 0.1 to 10 $\mu$m. If the average particle size is smaller than 0.1 $\mu$m, there is excessive agglomeration of the particles and cracks tend to occur in the undercoat layers 142, 162 at the time of coating the paste, drying, or baking. If the average particle size is larger than 10 $\mu$m, the dispersion of the particles becomes uneven and formation of a paste becomes difficult. Further, variations occur in the sintering of the conductive material and as a result variations may occur in the mounting strength.

The content of the first conductive material in the undercoat layer paste is preferably 70 to 80 wt %.

The first glass frit functions as a sintering aid of the metal included in the first conductive material and functions to secure the bondability with the capacitor device body 12.

The composition of the first glass frit is not particularly limited so long as the frit functions as a glass after firing, but preferably use is made of strontium borosilicate-based glass.

The average particle size of the first glass frit is preferably about 0.01 to 30 $\mu$m. If the average particle size is smaller than 0.01 $\mu$m, the sintering of the first conductive material becomes uneven. This tends to become a factor behind occurrence of cracks in the undercoat layers 142, 162. If the average particle size is larger than 30 $\mu$m, the dispersion of the glass becomes poor and the bondability with the capacitor device body 12 tends to fall.

The content of the first glass frit in the undercoat layer paste is preferably 5 to 15 wt %. If the content of the first glass frit is too small, the bondability with the capacitor device body 12 cannot be secured and the mounting strength becomes smaller.

As the organic vehicle contained in the undercoat layer paste, one mentioned above may be used.

The outer layer paste is prepared from at least a third conductive material mainly comprised of silver and including palladium, a second glass frit, and an organic vehicle.

The average particle size of the third conductive material is preferably about 0.1 to 10 $\mu$m. If the average particle size is less than 0.1 $\mu$m, there is excess agglomeration of the particles and cracks tend to occur in the outer layers 146, 166 at the time of coating the paste, drying, or baking. If the average particle size is larger than 10 $\mu$m, the dispersion of the particles becomes uneven and formation of a paste becomes difficult. Further, variations occur in the sintering of the conductive material and as a result variations may occur in the mounting strength.

The content of the third conductive material in the outer layer paste is preferably 70 to 80 wt %.

The second glass frit functions as a sintering aid of the metal contained in the third conductive material. and functions to secure the bondability with the undercoat layers 142, 162.

The composition of the second glass frit is not particularly limited, but the frit preferably contains glass frit of the same composition as the first glass frit contained in the undercoat layer paste, more preferably is comprised of a glass frit of the same composition as the first glass frit. This glass frit is preferably a strontium borosilicate-based glass.

The average particle size of the second glass frit is preferably 0.01 to 30 $\mu$m. If the average particle size is smaller than 0.01 $\mu$m, the sintering of the third conductive material becomes uneven and tends to result in cracks in the outer layers 146, 166, while if the average particle size is larger than 30 $\mu$m, the dispersion of the glass becomes poor and the bondability with the undercoat layers 142, 162 tends to decline.

The content of the second glass frit in the outer layer paste is preferably 5 to 15 wt %. If the content of the second glass frit is too small, the bondability with the undercoat layers 142, 162 cannot be secured and the mounting strength becomes smaller. If the content of the second glass frit becomes too large, a large amount of the glass floats up to the surface of the external electrodes 14, 16 and easily deposits on other chips.

The organic vehicle contained in the outer layer paste may be one of those listed above.

Note that the content of the organic vehicle in the pastes is not particularly limited. The normal content, for example, is about 1 to 5 wt % of binder and 10 to 50 wt % of a solvent. Further, the pastes may further contain, in accordance with need, additives selected from various types of dispersants, plasticizers, dielectrics, and insulators. The total content of these is preferably not more than 10 wt %.

To produce the undercoat layer paste and the outer layer paste, it is sufficient to prepare predetermined amounts of the conductive material, glass frit, and organic vehicle, knead them for about one hour by a kneader, and then knead them by a triple roll.

(2) Next, a stacked body (green chip) of the dielectric layer paste and internal electrode paste is prepared.

When using a printing method, the dielectric layer paste and the internal electrode layer paste are successively printed on a polyethylene terephthalate (PET) or other substrate. At this time, the dielectric layer paste is successively printed so that alternate ends are exposed to the outside from the ends of the dielectric layer paste. Next, the result is cut into a predetermined shape, then the pastes are peeled off from the substrate to form a green chip.

As opposed to this, when using a sheet method, the dielectric layer paste is used to form a green sheet, the internal electrode layer paste is printed on top of the green sheet, then these are stacked, then cut to a predetermined shape to form a green chip.

(3) Next, the green chip is processed to remove the binder before sintering (firing or annealing) to thereby prepare the sintered chip of the capacitor device body 12.

The processing for removing the binder before the sintering may be performed under ordinary conditions. If the internal electrode layers 8, 10 contain a base metal, the processing is preferably performed under the following conditions:

Rate of temperature rise: 5 to 300° C./hour, particularly 10 to 100° C./hour

Holding temperature: 200 to 400° C., particularly 250 to 300° C.

Temperature holding time: 0.5 to 24 hours, particularly 5 to 20 hours

Atmosphere: air

The atmosphere when firing the green chip when the internal electrode layer paste includes a base metal is preferably mainly comprised of $N_2$, includes 1 to 10 vol % of $H_2$, and is wet by steam pressure at 10 to 35° C. to form a $H_2O$ gas.

The oxygen partial pressure is preferably made $10^{-8}$ to $10^{-3}$ atmospheres. If the oxygen partial pressure is less than this range, the base metal included in the internal electrode layers 8, 10 becomes abnormally sintered and ends up breaking in the middle. If the oxygen partial pressure is over this range, the internal electrode layers 8, 10 end up being oxidized.

The holding temperature at the time of firing is 1100 to 1400° C., more preferably 1200 to 1300° C. If the holding temperature is less than this range, the densification becomes insufficient, while if over this range, the internal electrode layers 8, 10 break in the middle. The temperature holding time at the time of firing is preferably 0.5 to 8 hours, more preferably 1 to 3 hours.

When firing the green chip in a reducing atmosphere, the fired sintered body is preferably annealed. The annealing is for reoxidizing the dielectric layers 4, 6. This enables the insulation resistance accelerated lifetime of the obtained capacitor 2 to be remarkably increased.

The oxygen partial pressure in the annealing atmosphere is preferably at least $10^{-3}$ Pa, more preferably $10^{-3}$ to $10^{-1}$ Pa. If the oxygen partial pressure is less than the above range, reoxidation of the dielectric layers 4, 6 is difficult, while if over the above range, the internal electrode layers 8, 10 tend to be oxidized.

The holding temperature at the time of annealing is preferably not more than 1100° C., more preferably 500 to 1000° C. If the holding temperature is less than the above range, the oxidation of the dielectric layers 4, 6 becomes insufficient, so the accelerated lifetime of the insulation resistance tends to deteriorate. If over the above range, not only do the internal electrode layers 8, 10 oxidize and the capacity fall, but also the layers react with the dielectric layers 4, 6 resulting in a tendency toward a shorter accelerated lifetime. Note that the annealing may be comprised of only a temperature raising process and temperature lowering process. In this case, there is no need for a temperature holding time and the holding temperature is synonymous with the maximum temperature. Further, the temperature holding time is preferably 0 to 20 hours, more preferably 2 to 10 hours. The atmospheric gas is preferably $N_2$ and wet $H_2$ gas.

Note that in the processing for removing the binder, firing, and annealing, to wet the $N_2$, $H_2$, or mixed gas, it is possible to use for example a wetter. The water temperature in this case is preferably 5 to 75° C.

The processing for removing the binder, firing, and annealing may be performed consecutively or independently. When performing these consecutively, preferably, after processing to remove the binder, the atmosphere is changed without cooling and the processing performed independently.

When performing these consecutively, preferably, after processing to remove the binder, the atmosphere is changed without cooling, then the temperature is raised to the holding temperature for firing, the firing performed, then the chip is cooled, the atmosphere is changed when the holding temperature of the annealing is reached, and then annealing is performed. On the other hand, when performing these independently, at the processing to remove the binder, preferably the temperature is raised to the predetermined holding temperature, held there for a predetermined time, then lowered to room temperature.

The atmosphere for the processing for removing the binder is made the same as the case of consecutive processing. Further, it is possible to perform the processing for removing the binder and the firing consecutively and perform only the annealing independently. Further, it is possible to perform only the processing for removing the binder independently and perform the firing and annealing consecutively.

(4) Next, the undercoat layer paste is coated and dried on the two ends of the sintered chip (device body 12) to form the pre-baking undercoat layers. In this case, it is preferable to coat an undercoat layer paste on only the two end faces where the ends of the internal electrode layers 6, 8 are exposed at the two ends of the sintered chip. The amount of the undercoat layer paste coated is not particularly limited and may be suitably adjusted according to the size of the sintered chip to be coated. Normally, it is coated to give a thickness of about 5 to 100 µm.

Next, the outer layer paste is coated and dried on the outer surface of the pre-baking undercoat layer to form the pre-baking outer layers. The amount of the outer layer paste coated may be suitably selected. It is sufficient to coat it to give a thickness of about 50 to 250 µm.

The method of coating the undercoat layer paste and the outer layer paste is not particularly limited, but the dip method etc. may be used. The undercoat layer paste and the outer layer paste are preferably dried at around 150° C. for about 10 minutes.

(5) Next, processing is performed to remove the binder contained in the pre-baking undercoat layers and the pre-baking outer layers. The conditions for the processing to remove the binder are not particularly limited, but normally the processing is performed at about 300 to 600° C. for about 1 to 60 minutes in the air. During the processing to remove the binder, when the internal electrode layers 8, 10 contain a base metal, the base metal is oxidized, so reduction for reducing the oxidized base metal is preferably performed. The reduction is not particularly limited, but is preferably performed at 250 to 600° C. for 0.1 to 60 minutes in a mixed atmosphere of $N_2$ and $H_2$.

(6) Next, the pre-baking undercoat layers and the pre-baking outer layers are co-baked (simultaneously baked) to the sintered chip under the following conditions:

Atmosphere: An $N_2$ neutral atmosphere or reducing atmosphere of a mixed gas of $N_2$ and $H_2$ etc., preferably a reducing atmosphere Holding temperature: Preferably over 600° C. to less than 800° C., more preferably 650° C. to 750° C.

Holding time: Preferably 0.1 to 60 minutes, more preferably 0.5 to 10 minutes

Due to this simultaneous baking, in the present embodiment, the undercoat layers 142, 162 and the outer layers 146, 166 are formed on the two end faces of the sintered chip (device body 12) and intermediate layers 144, 164 containing a second conductive material mainly comprised of a copper-palladium based alloy are formed between the undercoat layers 142, 162 and the outer layers 146, 166.

As a result of the above steps, a multi-layer ceramic chip capacitor 2 of the configuration shown in FIG. 1 is obtained.

In the method of producing a multi-layer ceramic chip capacitor 2 according to the present embodiment, by baking the pre-baking undercoat layers and pre-baking outer layers formed on the two ends of the capacitor device body 12 comprised of the alternately arranged dielectric layers 4, 6 and internal electrode layers 8, 10 at a specific temperature, specific intermediate layers are created between the undercoat layers and outer layers along with the formation of the undercoat layers and outer layers, so a multi-layer ceramic chip capacitor 2 with improved reliability is produced.

Further, in the present embodiment, since no electroplating is performed and since the pre-baking undercoat layers and pre-baking outer layers are simultaneously baked, the production process is simplified and a multi-layer ceramic chip capacitor 2 improved in reliability can be produced at a low cost.

Further, by coating the undercoat layer paste and forming the pre-baking undercoat layer at only the two end faces of the sintered chip (capacitor device body 12), it is possible to suppress the increase in thickness around the peripheral edges of the device body 12 even if the thicknesses of the external electrodes 14, 16 formed by the subsequent baking increase, so it is possible to accurately obtain the dimensions of the external electrodes 14, 16.

Above, the explanation was made of an embodiment of the present invention, but the present invention is not limited to this embodiment and may of course be worked in various ways within the scope of the gist of the invention.

For example, in the above embodiment, a multi-layer ceramic chip capacitor 2 was illustrated as the multi-layer ceramic electronic device, but the multi-layer ceramic electronic. device according to the present invention is not limited to a multi-layer ceramic chip capacitor and may be any electronic device having a device body comprised of alternately arranged dielectric layers and internal electrode layers and external electrodes of the above structure formed on the outer surface of the device body.

Next, the present invention will be described with reference to more detailed examples, but the present invention is not limited to these examples.

EXAMPLE 1

First, to prepare the undercoat layer paste, Cu powder (average particle size: 1 µm), a strontium borosilicate-based glass frit (average particle size: 1 µm), and an organic vehicle (organic binder: acrylic resin, organic solvent: terpineol) were prepared. The Cu powder, strontium borosilicate-based glass frit, and organic vehicle were mixed in predetermined amounts, then mixed by a kneader for 1 hour, then kneaded by a triple roll to obtain an undercoat layer paste. Here, the amount of the glass frit added was adjusted to 7 parts by weight with respect to 100 parts by weight of Cu powder. The organic vehicle was comprised of 6 parts by weight of organic binder and 20 parts by weight of organic solvent. The content of the organic vehicle in the undercoat layer paste was made 21 wt %.

Next, to prepare the outer layer paste, an Ag powder containing Pd (Ag content: 66 wt %, Pd content: 4 wt %, average particle size: 1 µm), strontium borosilicate-based glass frit (average particle size: 1 µm), and an organic vehicle (organic binder: acrylic resin, organic solvent: terpineol) were prepared. These were used to obtain an outer layer paste in the same way as the undercoat layer paste.

Next, as the main ingredients of the dielectric layers, $BaCO_3$ (average particle size: 2.0 µm) and $TiO_2$ (average particle size: 2.0 µm) were prepared. The atomic ratio of Ba/Ti was 1.00. Further, in addition, as additives for the $BaTiO_3$, 0.2 wt % of $MnCO_3$, 0.2 wt % of $MgCO_3$, 2.1 wt % of $Y_2O_3$, and 2.2 wt % of $(Ba,Ca)SiO_3$ were prepared. The various powders were mixed by a underwater ball mill, and dried. The obtained mixed powder was calcined at 1250° C. for 2 hours. The calcined powder was pulverized by an underwater ball mill and dried. An acrylic resin was added to the obtained calcined powder as an organic binder and methylene chloride as an organic solvent. These were mixed to obtain a dielectric slurry. The obtained dielectric slurry was spread by the doctor blade method to form a dielectric green sheet.

As the material comprising the internal electrode layers, an Ni powder (average particle size of 0.8 µm) was prepared. Ethyl cellulose was added to this as an organic binder, and terpineol as an organic solvent. A triple roll was used to knead the mixture to obtain an internal electrode layer paste.

A plurality of dielectric green sheets were stacked to obtain a predetermined thickness, then the screen printing method was used to print the internal electrode layer paste on them so that the ends were alternately exposed outside from the ends of the dielectric layer green sheets. Nine of these green sheets were stacked and hot pressed. Next, the sintered chip was cut to a length of 3.2 mm, a width of 1.6 mm, and a thickness of 1.0 mm (C3216 type) to obtain a green chip.

The obtained green chip was fired by holding it in a wet $N_2+H_2$ ($H_2$: 3 vol %) atmosphere at 1300° C. for 3 hours, then was held in an atmosphere of an oxygen partial pressure $10^2$ Pa at 1000° C. for 2 hours to obtain a chip sintered body.

The undercoat layer paste was coated by the Paloma method on only the two ends of the obtained sintered body and dried at 150° C. for 10 minutes to form the pre-baking undercoat layers.

Next, the outer layer paste was coated by the Paloma method on the outer surface of the pre-baking undercoat layers and dried at 150° C. for 10 minutes to form the pre-baking outer layers.

Next, the pre-baking undercoat layers and the pre-baking outer layers were heated at 400° C. for 30 minutes in the air to remove the binder.

Next, they were heated at 450° C. for 30 minutes for reduction.

Next, the external electrodes were baked at 650° C. for 60 minutes in an $N_2$ atmosphere and the undercoat layers and outer layers were simultaneously formed on the sintered body to thereby obtain a multi-layer ceramic capacitor sample.

EXAMPLE 2

The same procedure was followed as in Example 1 to obtain a capacitor sample except for performing the baking of the external electrodes at 700° C.

EXAMPLE 3

The same procedure was followed as in Example 1 to obtain a capacitor sample except for performing the baking of the external electrodes at 750° C.

Comparative Example 1

The same procedure was followed as in Example 1 to obtain a capacitor sample except for performing the baking of the external electrodes at 600° C.

Comparative Example 2

The same procedure was followed as in Example 1 to obtain a capacitor sample except for performing the baking of the external electrodes at 800° C.

Using the capacitor samples obtained in Examples 1 to 3 and Comparative Examples 1 and 2, the interface between the undercoat layers and outer layers was examined by EPMA and the state of bonding of the undercoat layers and internal electrode layers and the state of bonding of the undercoat layers and the outer layers were evaluated. The results are shown in Table 1.

TABLE 1

| Baking temperature (° C.) | Presence of intermediate layer between undercoat layer and outer layer | Check of capacity for bond between undercoat layer and internal electrode layers | Presence of intermediate layer by EPMA for bond between undercoat layer and outer layer |
|---|---|---|---|
| Comp. Ex. 1 | 600 | None | Poor | No |
| Ex. 1 | 650 | Yes | Good | Yes |
| Ex. 2 | 700 | Yes | Good | Yes |
| Ex. 3 | 750 | Yes | Good | Yes |
| Comp. Ex. 2 | 800 | Yes | Poor | Yes |

As shown in Table 1, in the capacitor samples obtained in Example 1, Example 2, Example 3, and Comparative Example 2 (baking temperature of external electrodes: 650° C. to 850° C.), an intermediate layer including Cu—Pd alloy was confirmed at the interface of the undercoat layer and outer layer. As opposed to this, in the capacitor sample of Comparative Example 1 (same: 600° C.), no intermediate layer including a Cu—Pd alloy could be confirmed at the interface of the undercoat layer and outer layer. The reason why no intermediate layer could be confirmed in the capacitor sample of Comparative Example 1 is not necessarily clear, but it is considered that with 600° C., the baking temperature was insufficient, so the undercoat layer and internal electrode layer could not sufficiently chemically bond.

Further, regarding the state of bonding of the undercoat layer and the internal electrode layer, a check of the capacity of the capacitor sample of Comparative Example 1 (baking temperature of-external electrodes: 600° C.), and the capacitor sample of Comparative Example 2 (same: 800° C.) found them to be unsuitable. The reason is not necessarily clear, but it is believed that with 600° C. and 800° C., the baking temperature is unsuitable, particular, at 800° C., the baking temperature is excessive, so the bonds between the undercoat layer and outer layer become too strong and consequently the bonds between the undercoat layer and internal electrode layers end up breaking.

Due to the above, it could be confirmed that the creation of the intermediate layer including the Cu—Pd alloy was dependent on the baking temperature of the external electrodes and the baking temperature should be over 600° C. to less than 800° C.

EXAMPLE 4

Figure 2A:
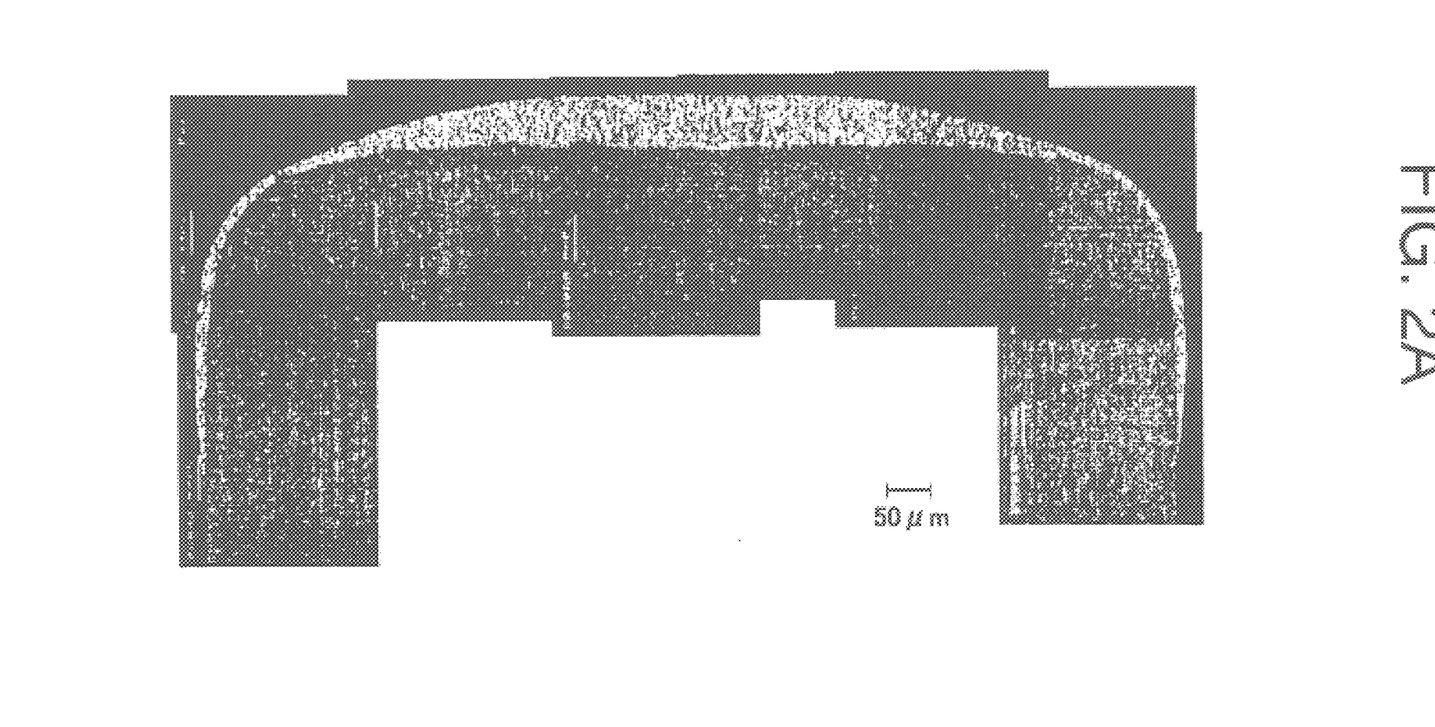
FIG. 2A is a micrograph showing a BEI (Backscattered Electron Image) of a polished surface obtained by polishing an external electrode of a capacitor sample according to Example 4.
Figure 2B:
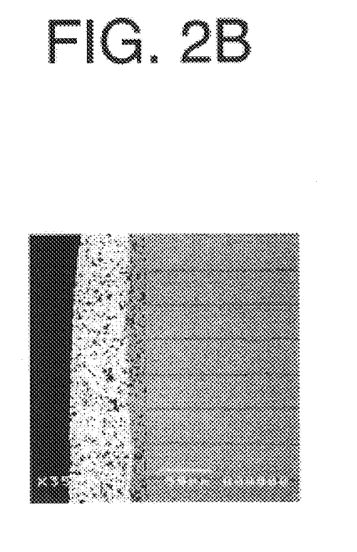
FIG. 2B is a micrograph showing the BEI of FIG. 2A enlarged from FIG. 2A.
Figure 2C:
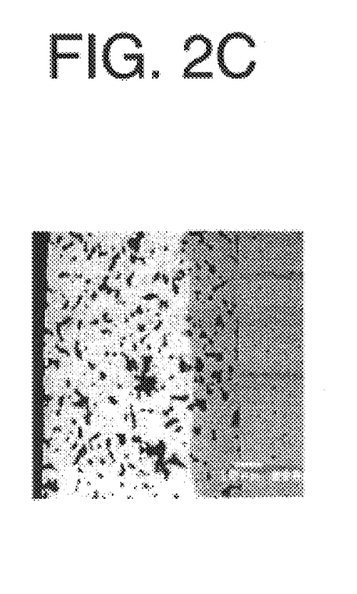
FIG. 2C is a micrograph showing the BEI of FIG. 2A enlarged further from FIG. 2B.

Examples 1 to 3 were corroborated. The same procedure was followed as in Example 1 to obtain capacitor samples except for baking the external electrodes at 695° C. The external electrodes of the obtained capacitor sample were ground. Backscattered electron images of the obtained ground faces are shown in FIG. 2A to FIG. 2C. Further, EPMA results of the obtained capacitor samples are shown in FIG. 3A to FIG. 3C.

Figure 3A:
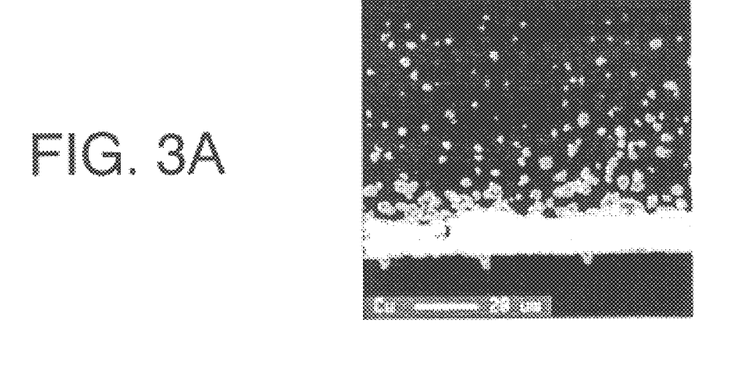
FIG. 3A is a micrograph showing a BEI of a polished surface obtained by polishing an external electrode of a capacitor sample according to Example 4 in the state of mutual diffusion of the internal electrode layers and the undercoat layer.
Figure 3B:
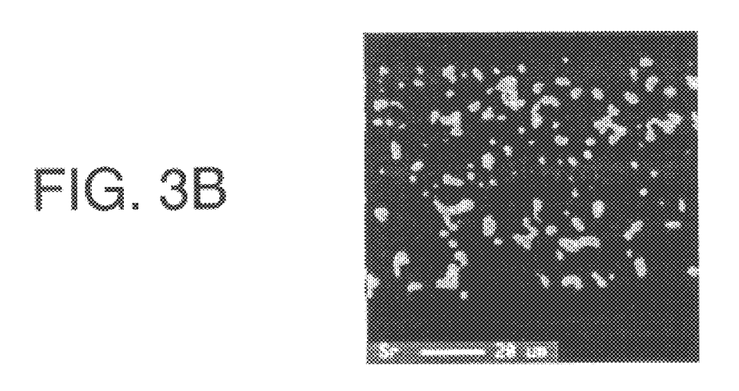
FIG. 3B is a micrograph showing a BEI of a polished surface obtained by polishing an external electrode of a capacitor sample according to Example 4 in the state of dispersion of glass frit.
Figure 3C:
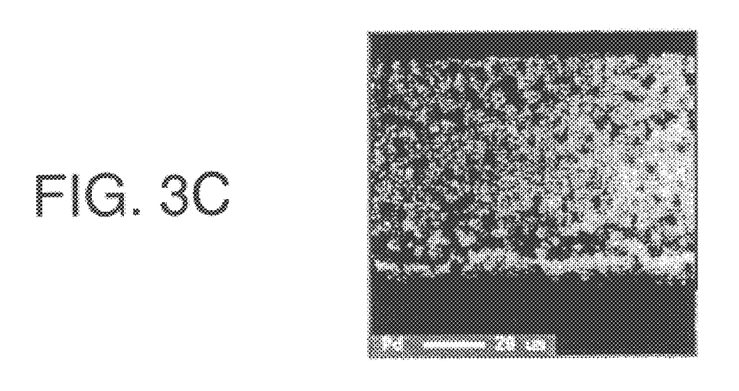
FIG. 3C is a micrograph showing a BEI of a polished surface obtained by polishing an external electrode of a capacitor sample according to Example 4 in the state of dispersion of a Pb ingredient.

As shown in FIG. 3A, in the capacitor sample of Example 4, the internal electrodes and the undercoat layer were confirmed to be diffused in each other. As shown in FIG. 3B, in the capacitor sample of Example 4, the strontium borosilicate-based glass frit was confirmed to be uniformly dispersed throughout the external electrodes. As shown in FIG. 3C, in the capacitor sample of Example 4, the Pb ingredient was also confirmed to be dispersed throughout the external electrodes.

Comparative Example 3

The same procedure was followed as in Example 1 to obtain a capacitor sample except for forming an outer. layers and Sn plating layer at the two ends of the sintered body without providing an undercoat layer.

Comparative Example 4

The same procedure was followed as in Example 1 to obtain a capacitor sample except for forming only an outer layer at the two ends of the sintered body.

Figure 4:
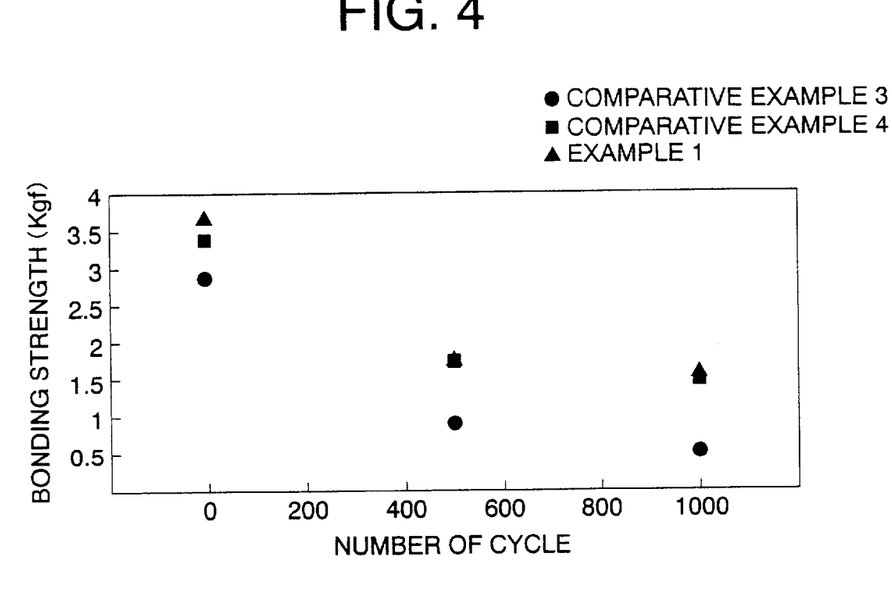
FIG. 4 is a graph of the results of a heat cycle test conducted using capacitor samples of Example 1, Comparative Example 3, and Comparative Example 4.

To check the bonding strength in the face of heat shock, a heat cycle test was performed using the capacitor samples obtained in Example 1 and Comparative Examples 3 to 4. The results are shown in FIG. 4. As shown in FIG. 4, the bonding strength of the capacitor sample of Example 1 was somewhat improved over that of the capacitor sample of Comparative Example 4 and was remarkably improved over that of the capacitor sample of Comparative Example 3.

Next, using the capacitor samples of Example 1 and Comparative Examples 3 and 4, a humidity test, pressure cracker test (PCT), and evaluation of the change in contact resistance due to heat shock were conducted. The results are shown in Table 2. Note that the unit in Table 2 is ohms ($\Omega$). The initial value was 0.1 to 0.2 ohms. The values in Table 2 show the state after the elapse of 100 hours.

TABLE 2

| | Humidity test | PCT | Heat shock test |
|---|---|---|---|
| Ex. 1 | 0.1 to 0.2 | 0.1 to 0.2 | 0.1 to 0.2 |
| Comp. Ex. 3 | 1 to 10 | 1000 to 10,000 | 0.5 to 2.0 |
| Comp. Ex. 4 | 0.1 to 0.2 | 0.1 to 0.2 | 0.1 to 0.2 |

As shown in Table 2, in the capacitor of Example 1, the contact resistance was confirmed to be substantially the same as that of the capacitor of Comparative Example 4 and remarkably improved from that of the capacitor of Comparative Example 3.

EXAMPLE 5

The same procedure was followed as in Example 1 to obtain a capacitor sample except for baking the external electrodes at 745° C.

Using the capacitor samples of Examples 4 and 5 and Comparative Example 4, the tensile strength between the capacitor device body and external electrodes when soldered together was tested. The results are shown in FIG. 5.

Figure 5:
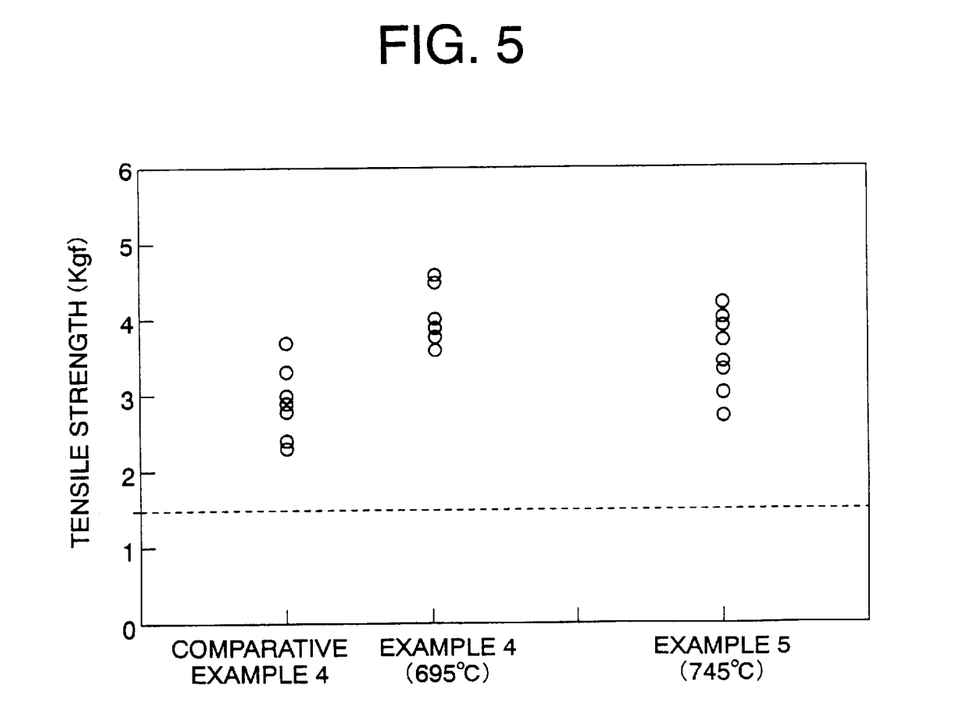
FIG. 5 is a graph of the results of a tensile strength test between a capacitor device body and external electrodes in the soldered state conducted using capacitor samples of Example 4, Example 5, and Comparative Example 4.

As shown in FIG. 5, in the capacitor samples of Examples 4 to 5, the tensile strength was confirmed to become higher than that of the capacitor of Comparative Example 4. In particular, the capacitor sample of Example 4 with the external electrodes baked at 695° C. was confirmed to be made higher in tensile strength.

EXAMPLE 6

The same procedure was followed as in Example 1 to obtain a capacitor sample except for changing the ratio of composition of the external electrodes (ratio by weight) to Ag/Pd/Cu=92.5/5.0/2.5.

EXAMPLE 7

The same procedure was followed as in Example 1 to obtain a capacitor sample except for changing the ratio of composition of the external electrodes (ratio by weight) to Ag/pd/Cu=82.5/15.0/2.5.

EXAMPLE 8

The same procedure was followed as in Example 1 to obtain a capacitor sample except for changing the ratio of composition of the external electrodes (ratio by weight) to Ag/Pd/Cu=72.5/25.0/2.5.

Comparative Example 5

The same procedure was followed as in Example 1 to obtain a capacitor sample except for changing the ratio of composition of the external electrodes (ratio by weight) to Ag=100 and forming an Ag outermost layer at the two ends of the sintered body.

Using the capacitor samples obtained at Examples 6 to 8 and Comparative Example 5, the ion migration was evaluated. The results are shown in FIG. 6.

Figure 6:
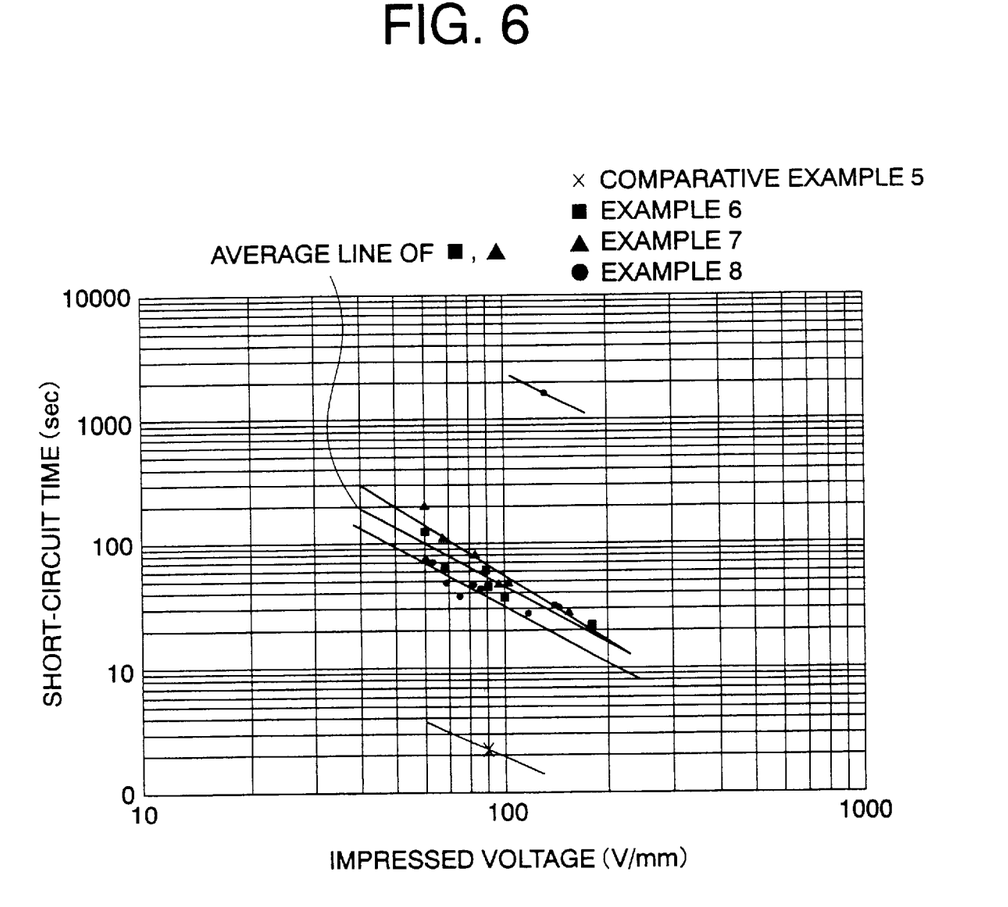
FIG. 6 is a graph of the results of evaluation of ion migration conducted using capacitor samples of Example 6, Example 7, Example 8, and Comparative Example 5.

As shown in FIG. 6, in the capacitor samples of Examples 6 to 8, the ion migration was confirmed to be improved compared with the capacitor sample of Comparative Example 5. In particular, the capacitor sample of Example 8 with a ratio of composition of Ag/Pd/Cu set to 72.5/25.0/2.5 was confirmed to be remarkably improved.

While the invention has been described with reference to specific embodiment chosen for purpose of illustration, it should be apparent that numerous modifications could be made thereto by those skilled in the art without departing from the basic concept and scope of the invention.

What is claimed is:

1. A multi-layer ceramic electronic device, comprising
a device body comprised of alternately arranged dielectric layers and internal electrode layers and
external electrodes formed on an outer surface of the device body,
each of the external electrodes having:
an undercoat layer directly formed on the outer surface of the device body so as to be electrically connected with at least part of the internal electrode layers;
an intermediate layer formed on an outer surface of the undercoat layer;
an outer layer formed on an outer surface of the intermediate layer;
the undercoat layer including a first conductive material mainly comprised of copper and a first glass ingredient;
the intermediate layer including a second conductive material mainly comprised of a copper-palladium-based alloy; and
the outer layer including a third conductive material mainly comprised of silver and further containing palladium and a second glass ingredient.

2. The multi-layer ceramic electronic device as set forth in claim 1, wherein the second glass ingredient includes a glass ingredient of the same composition as the first glass ingredient.

3. The multi-layer ceramic electronic device as set forth in claim 2, wherein the first glass ingredient includes a strontium borosilicate-based glass.

4. The multi-layer ceramic electronic device as set forth in claim 1, wherein the internal electrode layer includes a base metal.

5. The multi-layer ceramic electronic device as set forth in claim 2, wherein the internal electrode layer includes a base metal.

6. The multi-layer ceramic electronic device as set forth in claim 3, wherein the internal electrode layer includes a base metal.

7. The multi-layer ceramic electronic device as set forth in claim 1, wherein the undercoat layers are formed on only two end faces of the device body.

8. The multi-layer ceramic electronic device as set forth in claim 2, wherein the undercoat layers are formed on only two end faces of the device body.

9. The multi-layer ceramic electronic device as set forth in claim 3, wherein the undercoat layers are formed on only two end faces of the device body.

* * * * *